(12) United States Patent
Neumann et al.

(10) Patent No.: US 6,969,998 B2
(45) Date of Patent: Nov. 29, 2005

(54) MEASUREMENT OF ANGLE ROTATION USING MICROSTRIP RESONATORS (2.4GHZ,2 DEGREE)

(75) Inventors: Christian Neumann, Stuttgart (DE);
Ralf Schmidt, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 133 days.

(21) Appl. No.: 10/110,115

(22) PCT Filed: Jul. 25, 2001

(86) PCT No.: PCT/DE01/02813
§ 371 (c)(1),
(2), (4) Date: Jul. 19, 2002

(87) PCT Pub. No.: WO02/14818

PCT Pub. Date: Feb. 21, 2002

(65) Prior Publication Data
US 2003/0020450 A1    Jan. 30, 2003

(30) Foreign Application Priority Data
Aug. 11, 2000 (DE) ................................ 100 39 217

(51) Int. Cl.⁷ ............................................. G01R 27/04
(52) U.S. Cl. .................... 324/633; 324/644; 333/204
(58) Field of Search ................ 324/633–638, 324/207.13–207.25, 160, 166, 533, 644–648, 324/76.49, 76.51, 76.52, 76.53, 86, 300, 324/307, 309, 316, 76.56; 333/219.1, 134, 333/204, 305, 231, 235

(56) References Cited

U.S. PATENT DOCUMENTS

| | | | |
|---|---|---|---|
| 5,659,274 A | | 8/1997 | Takahashi et al. ........... 333/204 |
| 6,084,416 A | * | 7/2000 | Kishimoto ................... 324/644 |
| 6,130,591 A | * | 10/2000 | Tsuzuki ........................ 333/204 |
| 6,329,824 B1 | * | 12/2001 | Tsuzuki et al. .............. 324/633 |
| 6,450,034 B1 | * | 9/2002 | Suzuki et al. .................. 73/579 |

FOREIGN PATENT DOCUMENTS

| | | | |
|---|---|---|---|
| DE | 2 148 703 | 4/1973 | |
| DE | 33 28 421 A1 | 2/1984 | |
| DE | 33 17 284 A1 | 11/1984 | |
| DE | 197 12 374 A | 10/1998 | |
| EP | 0 851 215 A1 | 7/1998 | |
| JP | 2000241471 A  * | 9/2000 | ........... G01R 27/28 |

* cited by examiner

Primary Examiner—Minh Chau
(74) Attorney, Agent, or Firm—Michael J. Striker

(57) ABSTRACT

The present invention relates to a measuring device and a method for contactless detection of an angle of rotation or a torsional rotation. The measuring device includes a first resonator (2) and a second resonator (4). The two resonators (2, 4) have an essentially circular circumference, on which at least one protrusion and/or one recess is disposed. The two resonators (2, 4) are coplanar to one another and are also rotatable relative to one another. In addition, an exciter device (6) for exciting the resonators and a receiver device (6) for measuring a backscattered signal are present. Upon a relative rotation of the two resonators (2, 4) to one another, the resonant frequency changes, which is used as a measure for ascertaining the angle of rotation.

10 Claims, 5 Drawing Sheets

MEASUREMENT OF ANGLE ROTATION USING MICROSTRIP RESONATORS (2.4GHZ,2 DEGREE)

BACKGROUND OF THE INVENTION

The present invention relates to a device and a method for contactless detection of an angle of rotation or a torsional rotation. In particular, the present invention relates to a device and a method for contactless detection of very small angles or very small torsional rotations.

Measuring devices for contactless detection of angles of rotation, such as torque sensors, are known in the most various embodiments. Such measuring devices are sometimes based on different principles. For instance, optical sensors are known that detect the angle of rotation via a code placed on the rotating part. Magnetic sensors are also known, in which a magnetically generated field changes as a function of the angle of rotation, and this change can be used as a measure for the angle of rotation. In these sensors based on the principle of magnetism, it is disadvantageous that they are based on a complicated layer technology and their structure is relatively complicated, making them very expensive to produce. The optical sensors, conversely, are quiet vulnerable to soiling and can therefore be used only conditionally in the motor vehicle, for instance, and have a relatively short service life, since they are often used under extreme conditions.

SUMMARY OF THE INVENTION

The measuring device of the invention for contactless detection of an angle of rotation or a torsional rotation has the advantage over the prior art that it uses a change in a resonant frequency for instance, as a measure for ascertaining the angle of rotation or the torsional rotation. A first resonator and a second resonator are provided, and at feast one resonator is connected to the rotating element (such as a shaft) whose angle of rotation is to be determined. The resonators have an essentially circular circumference. Furthermore, at least on protrusion and/or one recess is embodied on the circumference of the respective resonators, and the resonators are coplanar to one another. Via the exciter device, the resonators are excited, and upon a rotation of the resonators relative to one another, the positions of the protrusions and the recesses of the resonators changes, and as a result, the respective resonant frequency changes as well. This change in the resonant frequency is a measure for a change in the angle of rotation or torsional rotation. However, it is also possible to determine the amplitude of the signal, backscattered by the resonators, at a fixed frequency (such as a frequency at the edge of the resonator curve) and to use it as a measure of the angle of rotation or the torsional rotation. Thus in accordance with the invention, very small angular changes in particular can be detected.

Preferably, the two resonators are embodied annularly. As a result, a simple structure and ease of production of the measuring device of the invention are attainable.

In another preferred and easily produced embodiment of the present invention, the resonators are embodied circularly.

In an advantageous embodiment of the invention, the recess of the resonators is embodied as a slit.

To enable good excitation of the resonators, the slit in the annular resonators is embodied as continuous.

To achieve an especially compact measuring device, in annular resonators the first resonator has a smaller outside diameter than the second resonator. Especially advantageously, the outside diameter of the first resonator is smaller than the inside diameter of the second resonator.

Preferably, the resonators are produced from printed circuit board material, with a metallization applied over it. As a result, the production costs for the measuring device of the invention can be kept low. However, it is also possible instead of the printed circuit board material to use a ceramic material, for instance. In the choice of material, it is important that a nonconductive material be used as the substrate material of the metallization.

Preferably, resonators are excited via an antenna. It is also possible for a reflection of the scattered parameters to be measured via the same antenna; this makes it possible to state the resonant frequency and thus the angle between the protrusions or slits of the resonators. If the measuring device of the invention is excited at precisely one frequency, which is preferably located at the edge of the resonance curve, then the antenna can also pick up the amplitude of the backscattered signal, which provides information on the position of the protrusions and recesses of the annular resonators. Given a suitable choice of the frequency at a predetermined resonance curve, a virtually linear signal can be obtained, making it especially simple to evaluate the signal for the applicable angles of rotation. However, it is also conceivable for a separate exciter antenna and a separate receiver antenna to be provided. Then the resonators can be disposed between the exciter antenna and the receiver antenna.

To make especially high precision possible, that is, the measurement of very small angles, the resonators in an outset position are disposed in such a way relative to one another that slits formed in the resonators are located in the same place, which is perpendicular to the resonators.

Advantageously, the resonators are excited with a microwave spectrum, or the resonators are excited at precisely one frequency, which is located at the edge of the resonance curve.

It is also possible for three or more resonators to be used in a single measuring device.

In the method according to the invention for ascertaining an angle of rotation, the two resonators provided with at least one protrusion and/or one recess are excited. Upon a rotation of the two resonators, which have an essentially circular circumference, relative to one another, the backscattered signal changes, and the change in the backscattered signal is proportional to a rotation of the two resonators relative to one another. The backscattered signal can therefore be used as a measure for the angle of rotation or the torsional rotation. In other words, the method of the invention employs a change in a resonant frequency, or a change in an amplitude of a selected frequency, to ascertain an angle of rotation.

According to the invention, a robust, easy to produce and economical measuring device, particularly for small angles, is thus made available. The measuring device of the invention is preferably used on steering linkages, or to ascertain the position of the throttle valve.

BRIEF DESCRIPTION OF THE DRAWINGS

Several exemplary embodiments of the invention are shown in the drawing and will be described in further detail in the ensuing description. Shown are.

DETAILED DESCRIPTION OF THE PREFERRED EMBODIMENTS

Figure 1:
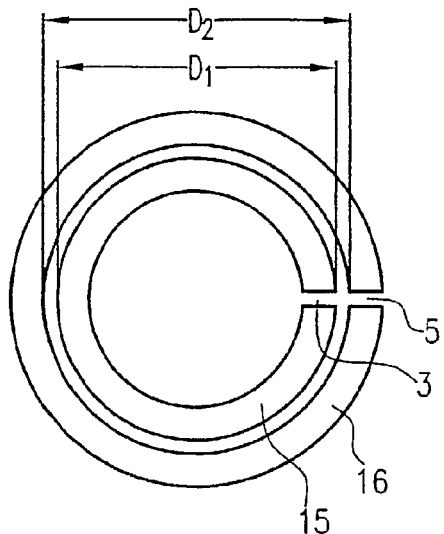
FIG. 1, a plan view on an arrangement of metallizations of two resonators, in a first exemplary embodiment of the present invention.
Figure 2:
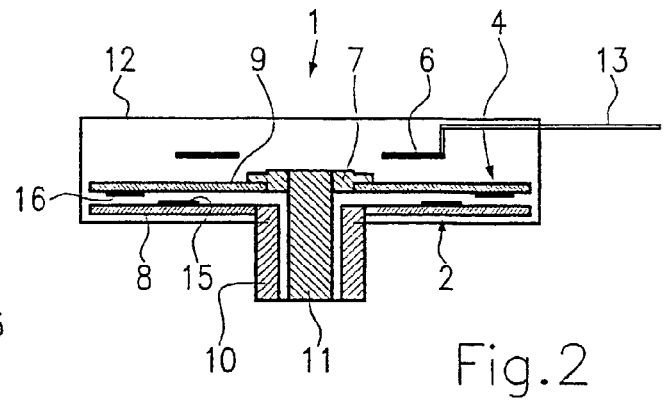
FIG. 2, a sectional view of a measuring device for contactless detection of an angle of rotation, in the first exemplary embodiment of the present invention.

In FIGS. 1 and 2, a first measuring device of the invention for contactless detection of an angle of rotation is shown. The measuring device 1 includes a first resonator 2 and a second resonator 4. The resonators 2 and 4 each comprise a respective substrate plate 8 and 9 and a metallization 15 and 16 applied over it (see FIG. 2). The substrate plates 8, 9 are made from a printed circuit board material. As shown in FIG. 1, the metallization 15 of the first resonator 2 has a slit 3, and the metallization 16 of the second resonator 4 has a slit 5. In FIG. 1, the two annularly embodied metallizations 15, 16 of the resonators 2 and 4 are shown in their outset position. It should be noted that besides the outset position shown in FIG. 1, outset positions with slits rotated relative to one another are also possible. An enhanced sensitivity can thus be achieved. Furthermore, with slits rotated relative to one another, the direction of rotation is also easily measurable.

The two resonators 2 and 4 are oriented relative to one another such that in the outset position, the slit 3 and the slit 5 are located in a plane perpendicular to the two resonators. The outside diameter $D_1$ of the metallization 15 of the first resonator 2 is smaller than the inside diameter $D_2$ of the metallization 16 of the second resonator 4. The two resonators 2, 4 are located in planes parallel to one another and have a defined spacing between them.

As shown in FIG. 2, the two resonators 2 and 4 are oriented so as to be coplanar to one another. The substrate plate 8 of the resonator 2 is secured directly to a first shaft 10. The substrate plate 9 of the resonator 4 is secured to a second shaft 11 via a connecting piece 7. The first shaft 10 is embodied as a hollow shaft, and the second shaft 11 is disposed in its interior. For instance, the second shaft 11 can be connected to the pivot shaft of a throttle valve, in order to ascertain the position of the throttle valve at a given time.

An annular antenna 6 is also provided, which communicates with a control and evaluation unit via a line 13. The antenna 6 serves as a joint exciter and receiver device. For shielding against external interference factors, a shield 12 serving as a housing is provided.

The function of the measuring device 1 in the first exemplary embodiment is as follows. Via the antenna 6, the measuring device is excited with a microwave spectrum. The antenna 6 also measures the reflection of the scattered parameters. If the first resonator 2 rotates relative to the second resonator 4 about the center axis, as a consequence of a rotation of the shaft 11, then the resonant frequency of the measuring device changes. This change in the resonant frequency can be associated, in an electronic evaluation unit, with an angle of rotation to determine the rotation between the first resonator 2 and the second resonator 4. Thus the angle of rotation between the first resonator 2 and the second resonator 4, and hence the relative rotation of the first shaft 10 to the second shaft 11, can be determined.

Because of the use of the resonators and the antenna, the measuring device of the invention is very robust in withstanding external factors and is easy to produce. Moreover, it is not vulnerable to soiling and can accordingly have a long service life. In particular, a very precise detection of even very tiny angles of rotation is also possible.

Figure 3:
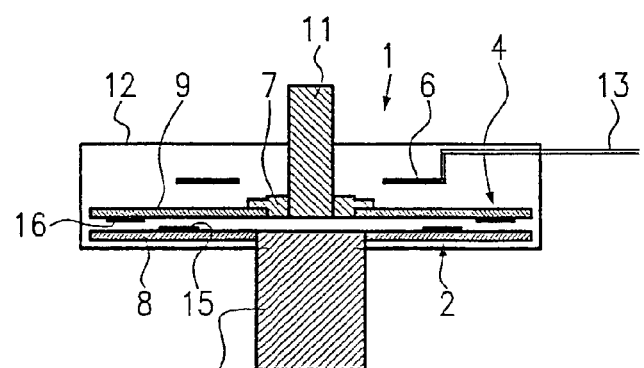
FIG. 3, a sectional view of a measuring device for contactless detection of an angle of rotation, in the second exemplary embodiment of the present invention.

In FIG. 3, a measuring device 1 in a second exemplary embodiment of the present invention is shown. Identical or similar parts are identified by the same reference numerals as in the first exemplary embodiment.

In contrast to the first exemplary embodiment, in the second exemplary embodiment the first shaft 10 and the second shaft 11 are disposed opposite one another. The second shaft 11 is connected via a connecting piece 7 to the substrate plate 9 of the second resonator 4, which carries a metallization 16 of the second resonator 4. A metallization 15 of the first resonator 2 is disposed on the first substrate plate 8, which in turn is connected to the first shaft 10. An antenna 6 is connected to an electronic evaluation unit, not shown, via a line 13. A shield 12 shields the measuring device 1 off from external factors.

The mode of operation of the measuring device 1 in the second exemplary embodiment is equivalent to that of the first exemplary embodiment and is therefore not shown or described further.

Figure 4:
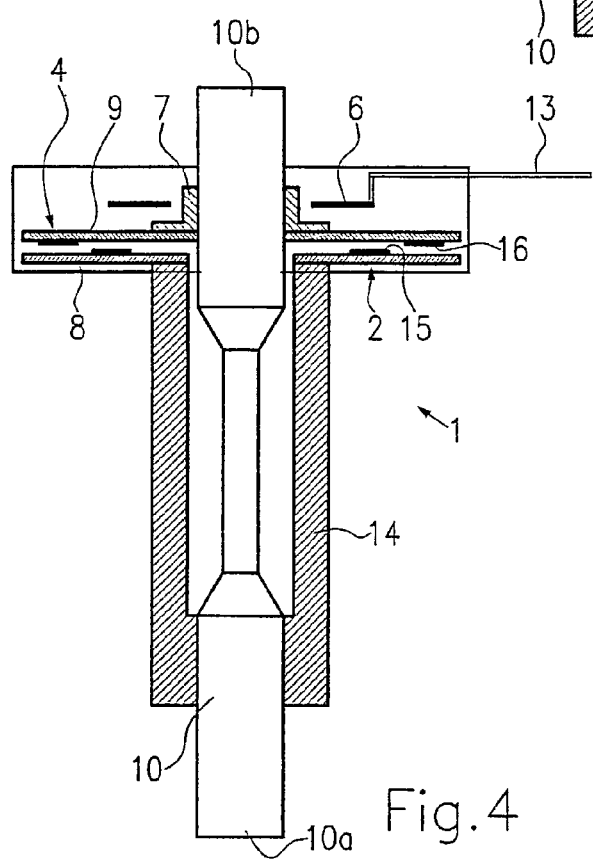
FIG. 4, a sectional view of a measuring device for contactless detection of an angle of rotation, in the third exemplary embodiment of the present invention.

In FIG. 4, a third exemplary embodiment of the measuring device 1 of the invention for detecting torsional rotations of a shaft 10 is shown. Identical or similar parts are again identified with the same reference numerals as in the two previous exemplary embodiments.

The two resonators 2 and 4 each include a respective substrate plate 8 and 9 and have annularly embodied metallizations 15 and 16, respectively. The shaft 10 is connected to the second substrate plate 9 via a connecting piece 7 and also to the first substrate plate 8 via a connecting piece 14. Here the second connecting piece 14 is embodied as a hollow shaft, which receives the shaft 10 inside it. An antenna 6, connected via a line 13 to an evaluation unit, serves as an exciter and receiver device.

Because of the embodiment of the measuring device in accordance with the third exemplary embodiment, it is possible to ascertain torsional rotations of the shaft 10 between a first shaft segment 10a and a second shaft segment 10b. Since because of the use of the resonators even very tiny rotations can also be picked up, it is thus also possible to determine very tiny torsional rotations of the shaft 10. The measuring device in the third exemplary embodiment can in particular be used on a steering rod to ascertain how sharply the steering wheel has been turned.

The function of the measuring device in the third exemplary embodiment is equivalent to that of the first two exemplary embodiments and therefore will not be described in further detail below. However, it should be noted that the measuring device in the third exemplary embodiment is simple to dispose at arbitrary positions on a shaft, and the torsional rotation of the shaft can be determined.

Figures 5A, 5B:
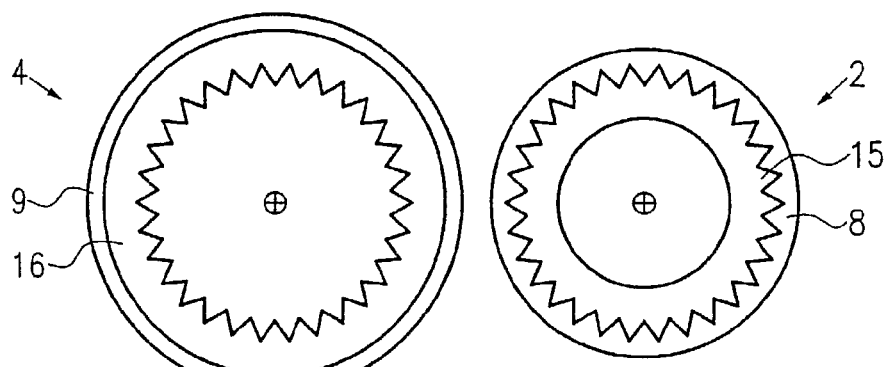
FIG. 5a, a plan view on a first resonator in a fourth exemplary embodiment of the present invention.
FIG. 5b, a plan view on a second resonator in the fourth exemplary embodiment.

In FIGS. 5a and 5b, the metallizations of two resonators 2 and 4 in a fourth exemplary embodiment of the present invention are shown. Identical or similar parts are identified by the same reference numerals as in the exemplary embodiments described above.

As shown in FIG. 5b, a first resonator 2 protrudes from a substrate plate 8 and a metallization 15 applied over it. The metallization 15 is embodied annularly and on its outer circumference has many regions that protrude in zigzag fashion. The second resonator 4 shown in FIG. 5a likewise includes a substrate plate 9 and an annularly embodied metallization 16. As shown in FIG. 5a, the metallization 16, on its inner circumferential edge, has zigzag recesses, which are complimentary to the zigzag protrusions of the metallization 15 of the first resonator 2. In the outset position of the two resonators 2 and 4, the two resonators 2, 4 can be disposed relative to one another such that the zigzag protrusions of the metallization 15 come to rest precisely above the zigzag recesses of the metallization 16 (Case 1), that the zigzags are precisely symmetrically above one another (Case 2), and that the zigzags assume an intermediate position between Case 1 and Case 2 (Case 3), in which the zigzags overlap only partly at their edges. In Cases 1 and 2, the signal for the outset position is located at the lower apex of the curves shown in FIG. 8. As a result, upon a rotation in one direction or the other, it is not possible to determine the direction of rotation, since the curves are essentially symmetrical to the lower apex of the curve. In the intermediate position of Case 3, the signal of the outset position is located in an ascending or descending region of the curve (see FIG. 8), so that the direction of rotation can also be determined, depending on the increasing or decreasing value. In Case 1, upon a rotation of the two resonators 2 and 4 relative to one another, the zigzag protrusions of the metallization 15 of the first resonator 2 partly overlap the protrusions of the first resonator 4 formed between the zigzag recesses. As a result, the resonant frequency of the system changes, and this can be used to determine an angle of rotation or a torsional rotation.

It should be noted that the embodiment of the metallizations of the resonators shown in FIGS. 5a and 5b can also be used in such a way that two resonators have either only the embodiment of the metallization as shown in FIG. 5a or only that shown in FIG. 5b. Then upon a rotation of the thus-embodied resonators relative to one another, the amount of overlap of the respective protrusions and recesses changes.

Figures 6A, 6B:
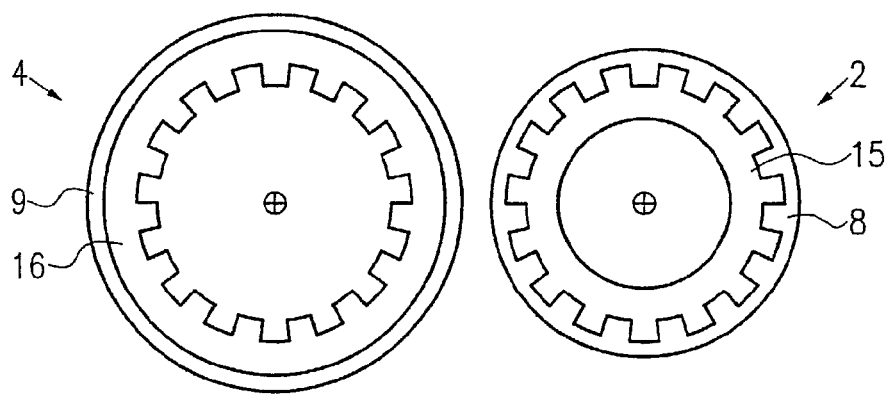
FIG. 6a, a plan view on a first resonator in a fifth exemplary embodiment of the present invention.
FIG. 6b, a plan view on a second resonator in the fifth exemplary embodiment.

In FIGS. 6a and 6b, an embodiment of resonators 2, 4 in a fifth exemplary embodiment of the present invention is shown. Identical or similar parts are again identified by the same reference numerals as in the above exemplary embodiments.

As shown in FIGS. 6a and 6b, in the first resonator 2 the metallization 15 is embodied on the substrate plate 8 in such a way that the metallization has many essentially rectangular protrusions 15 on its outer circumference (see FIG. 6b). The second resonator 4, on its inner circumference of its metallization 16, likewise has rectangular protrusions, resulting in rectangular recesses between the rectangular protrusions of the metallization 16, and these recesses are complementary to the rectangular protrusions of the metallization 15 of the first resonator 2. In the outset position, the two resonators 2 and 4 can again be disposed as in Cases 1–3 described above; especially if there is an only partial overlap of the protrusions (Case 3), the direction of rotation can again be determined. Upon a rotation of the two resonators 2 and 4 relative to one another, the resonant frequency or the amplitude of the signal backscattered by the resonators at a fixed frequency changes, which can be used as a measure of the angle of rotation.

It should also be noted that the embodiment of the metallizations shown respectively in FIGS. 6a and 6b can also be used in such a way that two resonators can be equipped with the same embodiment of the metallization (for instance, the type of metallization shown in FIG. 6a, or that shown in FIG. 6b).

Figures 7A, 7B:
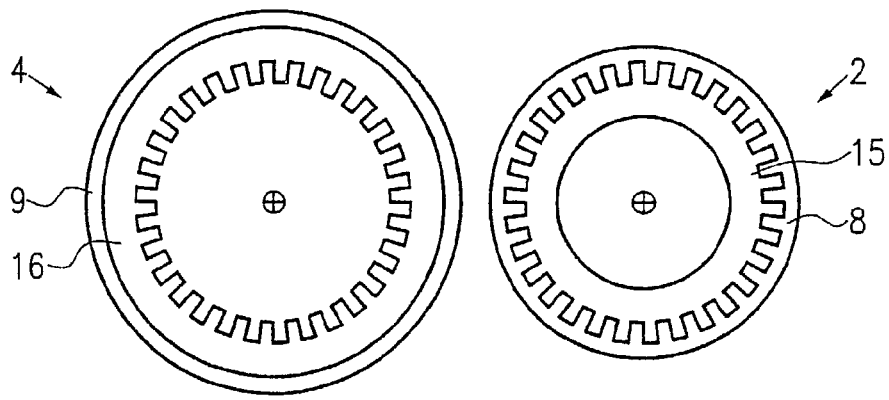
FIG. 7a, a plan view on a first resonator in a sixth exemplary embodiment of the present invention.
FIG. 7b, a plan view on a second resonator in the sixth exemplary embodiment.

In FIGS. 7a and 7b, two resonators 2 and 4 in a sixth exemplary embodiment of the present invention are shown. Once again, identical parts are identified by the same reference numerals as in the previous exemplary embodiments.

Essentially, the sixth exemplary embodiment shown in FIGS. 7a and 7b is equivalent to the fifth exemplary embodiment. Unlike the fifth exemplary embodiment, however, in the sixth exemplary embodiment the protrusions of the metallizations 15 and 16 are embodied in such a way that they have a lesser width and a lesser spacing from one another. It should be noted that the higher the repetition rate of the protrusions is, the smaller are the angles that can be measured. Otherwise, the resonators 2, 4 in the sixth exemplary embodiment are equivalent to those in the fifth exemplary embodiment.

Figure 8:
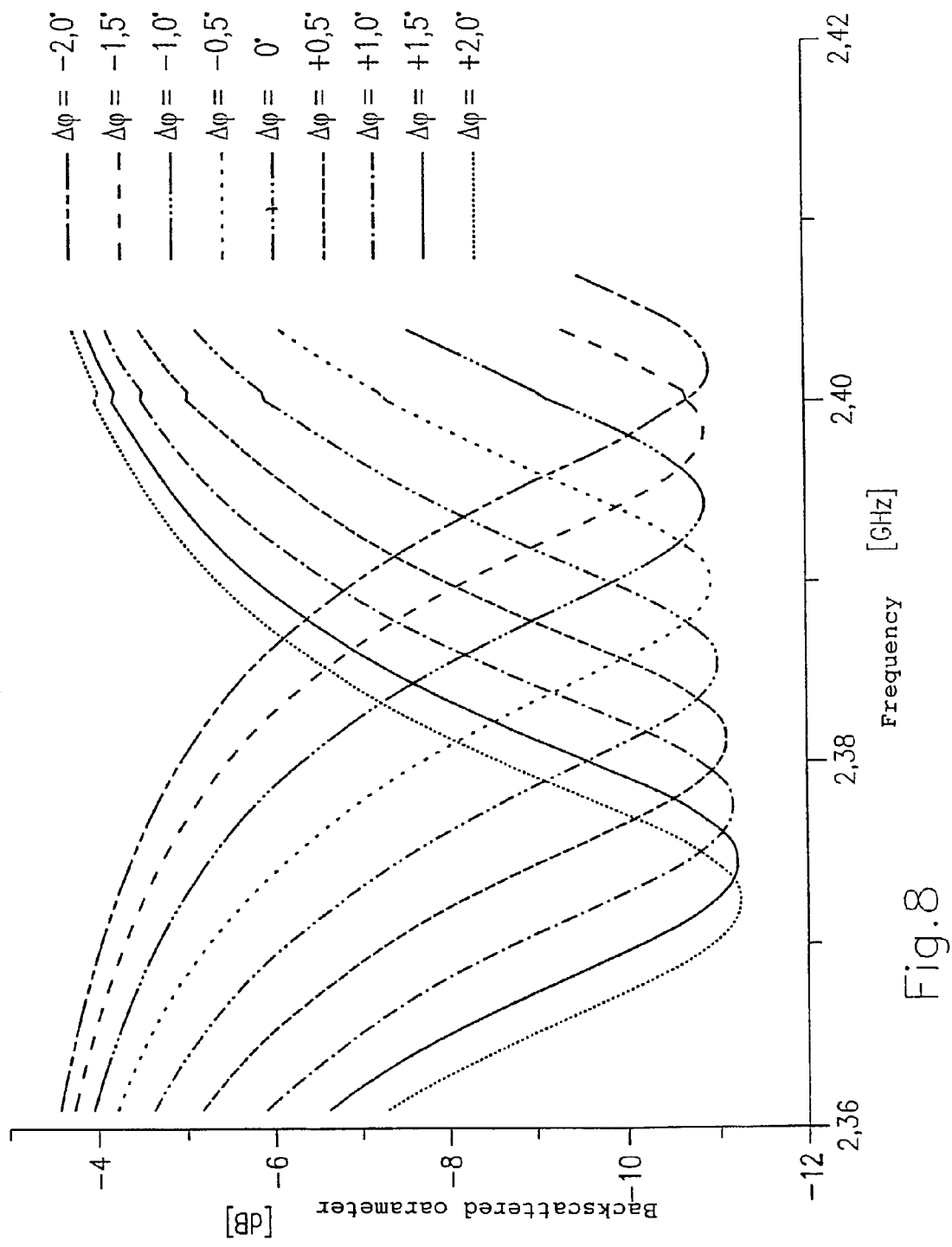
FIG. 8 is a graph showing the frequency shift upon a relative rotation of the resonators, shown in FIGS. 7a and 7b, in the sixth exemplary embodiment of the present invention.

In FIG. 8, a frequency shift is shown at a relative rotation of the resonators of the sixth exemplary embodiment, shown in FIGS. 7a and 7b. $\Delta\phi$ indicates the respective change from the absolute angle of $\phi=0°$.

Figure 9:
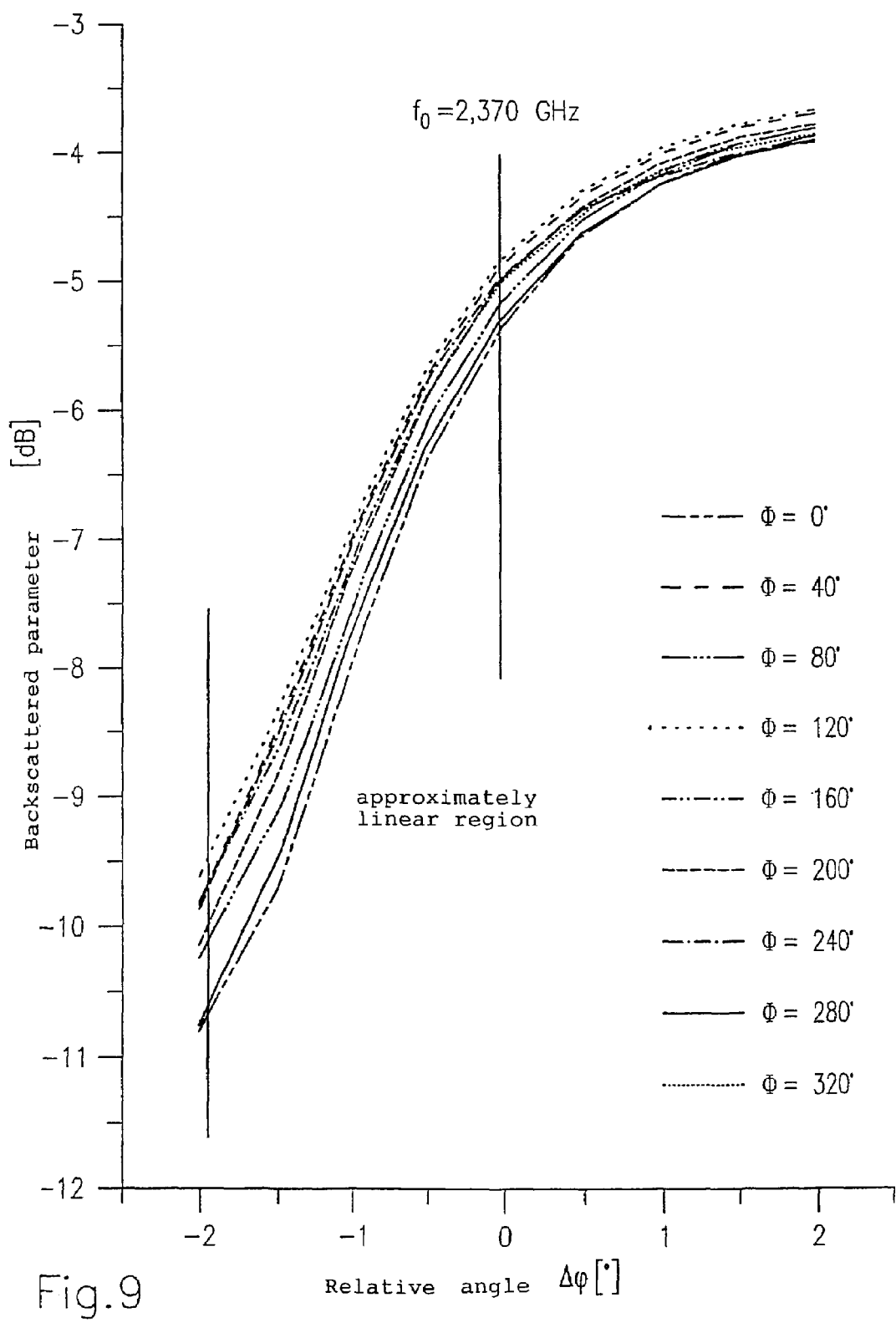
FIG. 9 is a graph showing a change in the signal at a first fixed frequency as a function of the rotation of the two resonators, shown in FIGS. 7a and 7b, in the sixth exemplary embodiment of the present invention.

In FIG. 9, a change in the signal is shown at a fixed frequency of $f_0=2.370$ GHz as a function of the rotation of the resonator disks to one another. Once again, the resonator disks, shown in FIGS. 7a and 7b, of the sixth exemplary embodiment are used. As can be seen from FIG. 9, this results in a virtually linear range, so that a virtually linear signal can be obtained for the changes in the angle of rotation $\phi$.

Figure 10:
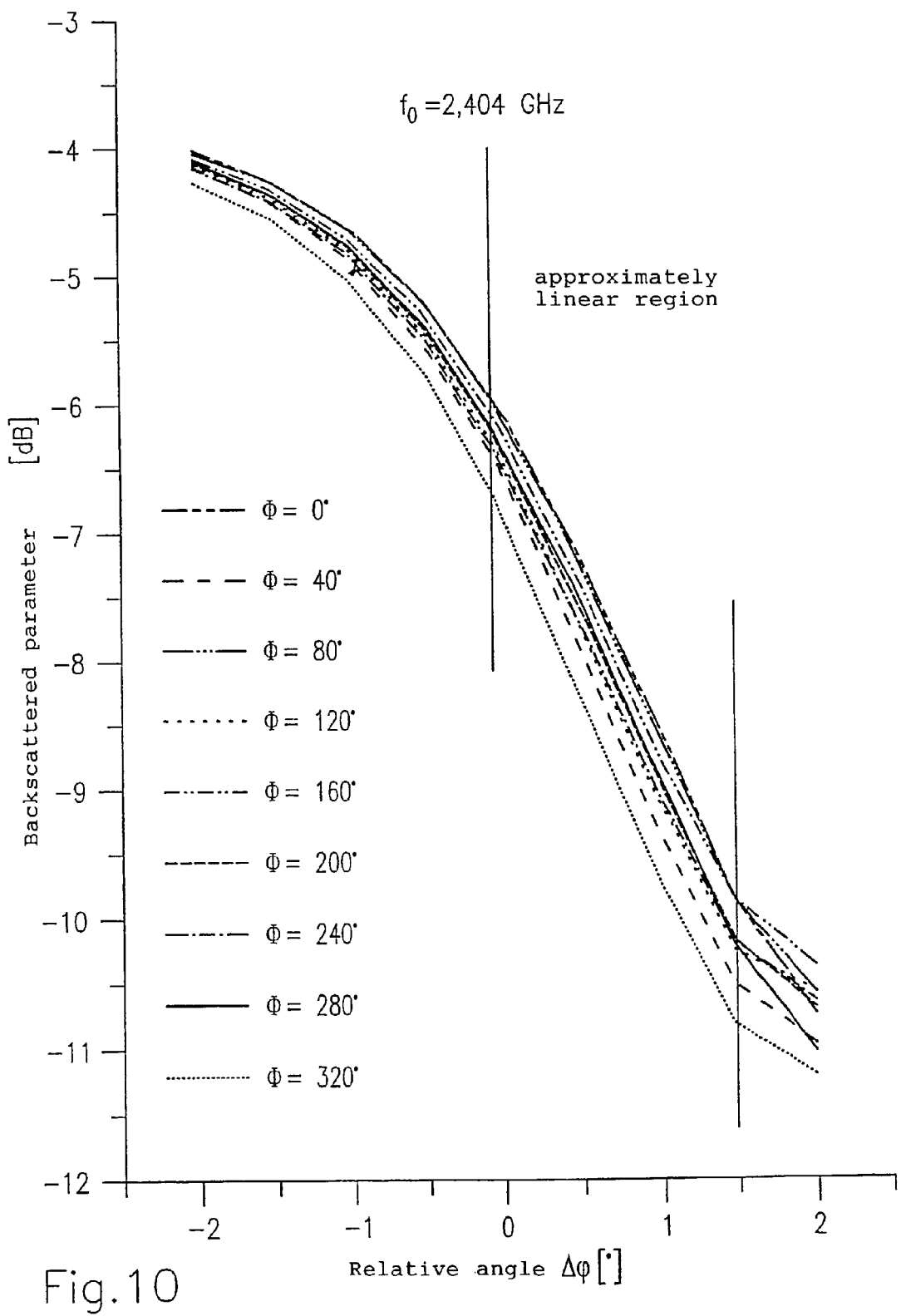
FIG. 10 is a graph showing a change in the signal at a second fixed frequency as a function of the rotation of the two resonators, shown in FIGS. 7a and 7b, in the seventh exemplary embodiment of the present invention.

In FIG. 10, curves for a fixed frequency are shown, corresponding to FIG. 9, but as the frequency a frequency of $f_0=2.474$ GHz has been selected. Once again, this results in a virtually linear range, within which a virtually linear signal can be obtained.

The present invention thus relates to a measuring device and a method for contactless detection of an angle of rotation or a torsional rotation. The measuring device includes a first resonator 2 and a second resonator 4. The two resonators 2, 4 have an essentially circular circumference, on which at least one protrusion and/or one recess is disposed. The two resonators 2, 4 are coplanar to one another and are also rotatable relative to one another. An exciter device 6 for exciting the resonators and a receiver device 6 for measuring a backscattered signal are also present. Upon a relative rotation of the two resonators 2, 4, the resonant frequency or the amplitude of the backscattered signal changes, which is used as a measure for ascertaining the angle of rotation.

The above description of the exemplary embodiments in the present invention is intended solely for purposes of illustration and not for the sake of limiting the invention. Within the scope of the invention, various changes and modifications can be made without departing from the scope of the invention or its equivalents.

What is claimed is:

1. A method for ascertaining an angle of rotation or a torsional rotation, in which two resonators (2, 4), provided with at least one protrusion and/or one recess (3, 5), are excited, wherein the two resonators (2, 4) have an essentially circular circumference and are rotatable relative to one another, and a rotation of one resonator relative to the other resonator leads to a change in its resonant frequency or to a change in an amplitude of the signal backscattered by the resonators (2, 4) at a fixed frequency, and the change in resonant frequency or amplitude is used as a measure for ascertaining the angle of rotation.

2. A measuring device for contactless detection of an angle of rotation or a torsional rotation of a rotating element (10), including a first resonator (2), a second resonator (4), an exciter device (6), and a receiver device (6), wherein the resonators (2, 4) have an essentially circular circumference, and there is at least one protrusion and/or one recess on the essentially circular circumference, wherein the resonators (2, 4) are coplanar to one another and rotatable relative to one another, and at least one resonator is connected to the rotating element (10), wherein the resonators (2, 4) are excited with a microwave spectrum, or wherein the resonators (2, 4) are excited with precisely one frequency, the frequency being located at the edge of the resonance curve.

3. The measuring device for contactless detection of an angle or rotation or a torsional rotation of claim 2, wherein the resonators (2, 4) are embodied annularly.

4. The measuring device for contactless detection of an angle or rotation or a torsional rotation of claim 3, wherein the first resonator (2) has a smaller outside diameter than the second resonator (4).

5. The measuring device for contactless detection of an angle or rotation or a torsional rotation of claim 4, wherein the first resonator (2) has an outside diameter ($D_1$) which is smaller than the inside diameter ($D_2$) of the second resonator (4).

6. The measuring device for contactless detection of an angle or rotation or a torsional rotation of claim 2, wherein the resonators (2, 4) are embodied circularly.

7. The measuring device for contactless detection of an angle or rotation or a torsional rotation of claim 2, wherein the recess is embodied as a slit (3, 5).

8. The measuring device for contactless detection of an angle or rotation or a torsional rotation of claim 7, wherein the slits (3, 5) are embodied as continuous.

9. The measuring device for contactless detection of an angle or rotation or a torsional rotation of claim 2, wherein the resonators (2, 4) are formed of printed circuit board material, with a metallization (15, 16) applied over it.

10. The measuring device for contactless detection of an angle or rotation or a torsional rotation of claim 2, wherein a single antenna (6) is provided simultaneously as the exciter device and as the receiver device.

* * * * *